United States Patent
Anglin et al.

[11] Patent Number: 6,023,709
[45] Date of Patent: Feb. 8, 2000

[54] AUTOMATED FILE ERROR CLASSIFICATION AND CORRECTION IN A HIERARCHICAL STORAGE MANAGEMENT SYSTEM

[75] Inventors: Matthew Joseph Anglin, Vail; Gregory Tad Kishi, Oro Valley; David Lee Patterson, Tucson, all of Ariz.

[73] Assignee: International Business Machines Corporation, Armonk, N.Y.

[21] Appl. No.: 08/990,105

[22] Filed: Dec. 15, 1997

[51] Int. Cl.[7] .................................................... G06F 17/30
[52] U.S. Cl. ......................... 707/204; 707/2; 707/202; 707/204
[58] Field of Search ..................... 707/204, 202, 707/2

[56] References Cited

U.S. PATENT DOCUMENTS

| | | | |
|---|---|---|---|
| 4,467,421 | 8/1984 | White | 711/118 |
| 5,043,871 | 8/1991 | Nishigaki et al. | 364/200 |
| 5,193,171 | 3/1993 | Shinmura et al. | 707/204 |
| 5,313,629 | 5/1994 | Abraham et al. | 707/204 |
| 5,381,545 | 1/1995 | Baker et al. | 395/575 |
| 5,394,539 | 2/1995 | Neuhard et al. | 707/204 |
| 5,403,639 | 4/1995 | Belsan et al. | 707/204 |
| 5,418,940 | 5/1995 | Mohan | 395/575 |
| 5,423,018 | 6/1995 | Dang et al. | 707/204 |
| 5,438,674 | 8/1995 | Keele et al. | 707/204 |
| 5,448,718 | 9/1995 | Cohn et al. | 707/204 |
| 5,465,350 | 11/1995 | Fueki | 707/204 |
| 5,475,834 | 12/1995 | Anglin et al. | 707/204 |
| 5,504,883 | 4/1996 | Coverston et al. | 707/204 |
| 5,594,863 | 1/1997 | Stiles | 395/182.13 |
| 5,604,862 | 2/1997 | Midgely et al. | 711/161 |
| 5,642,505 | 6/1997 | Fushimi | 707/204 |
| 5,644,766 | 7/1997 | Coy et al. | 707/204 |
| 5,664,186 | 9/1997 | Bennett et al. | 707/204 |
| 5,758,357 | 5/1998 | Barry et al. | 707/202 |
| 5,796,999 | 8/1998 | Azagury et al. | 707/204 |
| 5,832,526 | 11/1998 | Schuyler | 707/205 |
| 5,857,204 | 1/1999 | Lordi et al. | 707/202 |
| 5,875,444 | 2/1999 | Hughes | 707/2 |
| 5,887,274 | 3/1999 | Barry et al. | 707/202 |

OTHER PUBLICATIONS

ADSTAR Distributed Storage Manager (ADSM)—Hierarchical Storage Management (HSM) White Paper (IBM Document No. G522–24322–00), (http://www.storage.ibm.com/storage/software/adsm/adwhhsm.htm/, Mar. 1996 15 pages.

*Primary Examiner*—Anton W. Fetting
*Assistant Examiner*—Shahid Alam
*Attorney, Agent, or Firm*—David W. Victor; Konrad Raynes & Victor

[57] ABSTRACT

Disclosed is a system to diagnose and handle errors in an automated hierarchical storage management system. A host system requests an access operation on a first file, such as a logical volume, in a first storage device, such as a magnetic hard disk drive. A server processes the host request to determine whether the first file is resident in the first storage device. The server initiates a recall of a second file, such as a physical volume, in a second storage device, such as tape cartridges, optical disks, etc., corresponding to the first file upon determining that the first file is not resident in the first storage device. The second file is then copied from the second storage device to the first file in the first storage device upon determining that the second file is accessible. The server further determines whether the recall of the second file has failed. Upon determining that the recall has failed, the server checks a table in a memory within the server to determine whether there is error information listed for the second file involved in the failed recall. The server then takes appropriate action based on the error information in the table.

29 Claims, 4 Drawing Sheets

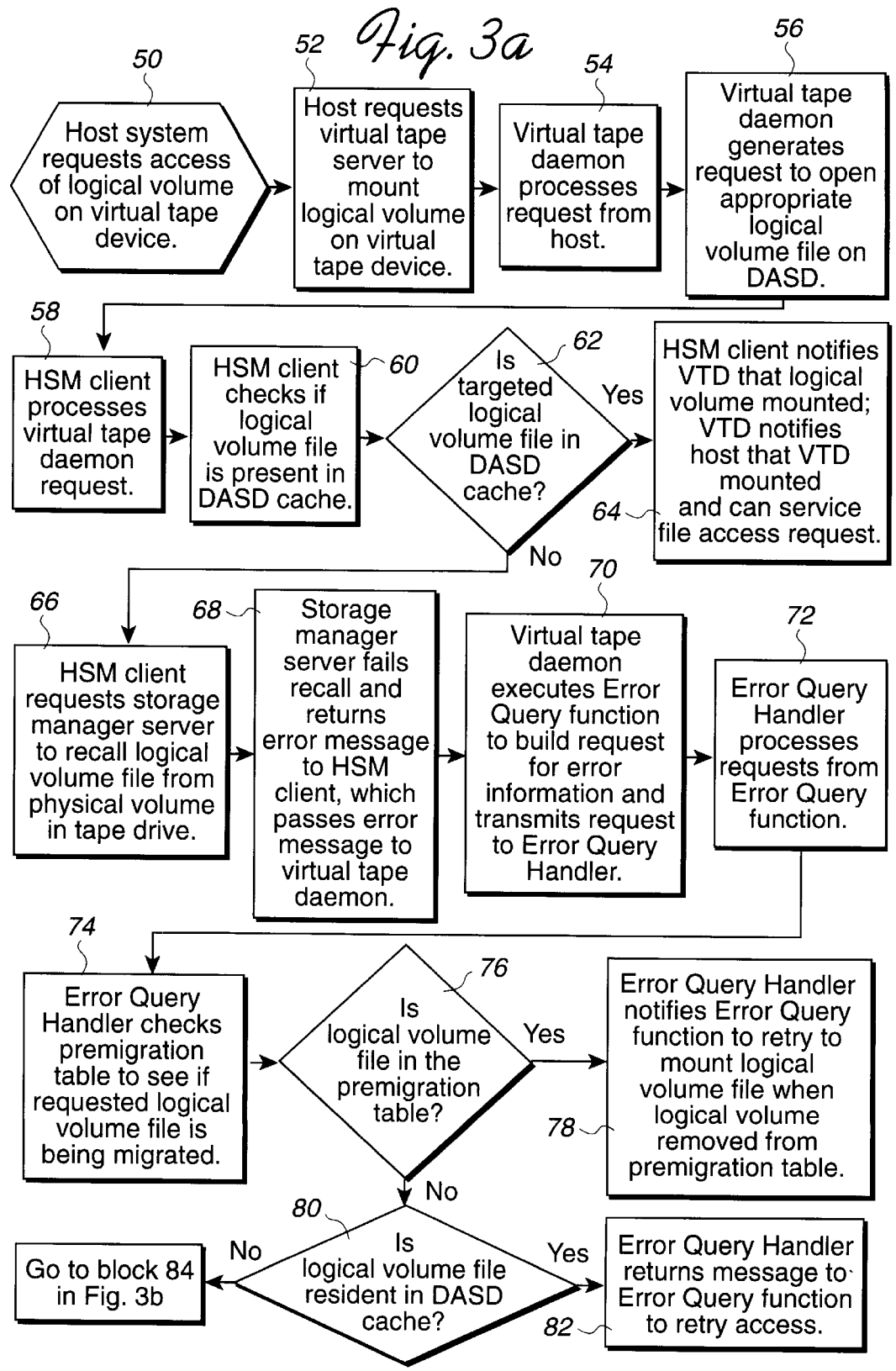

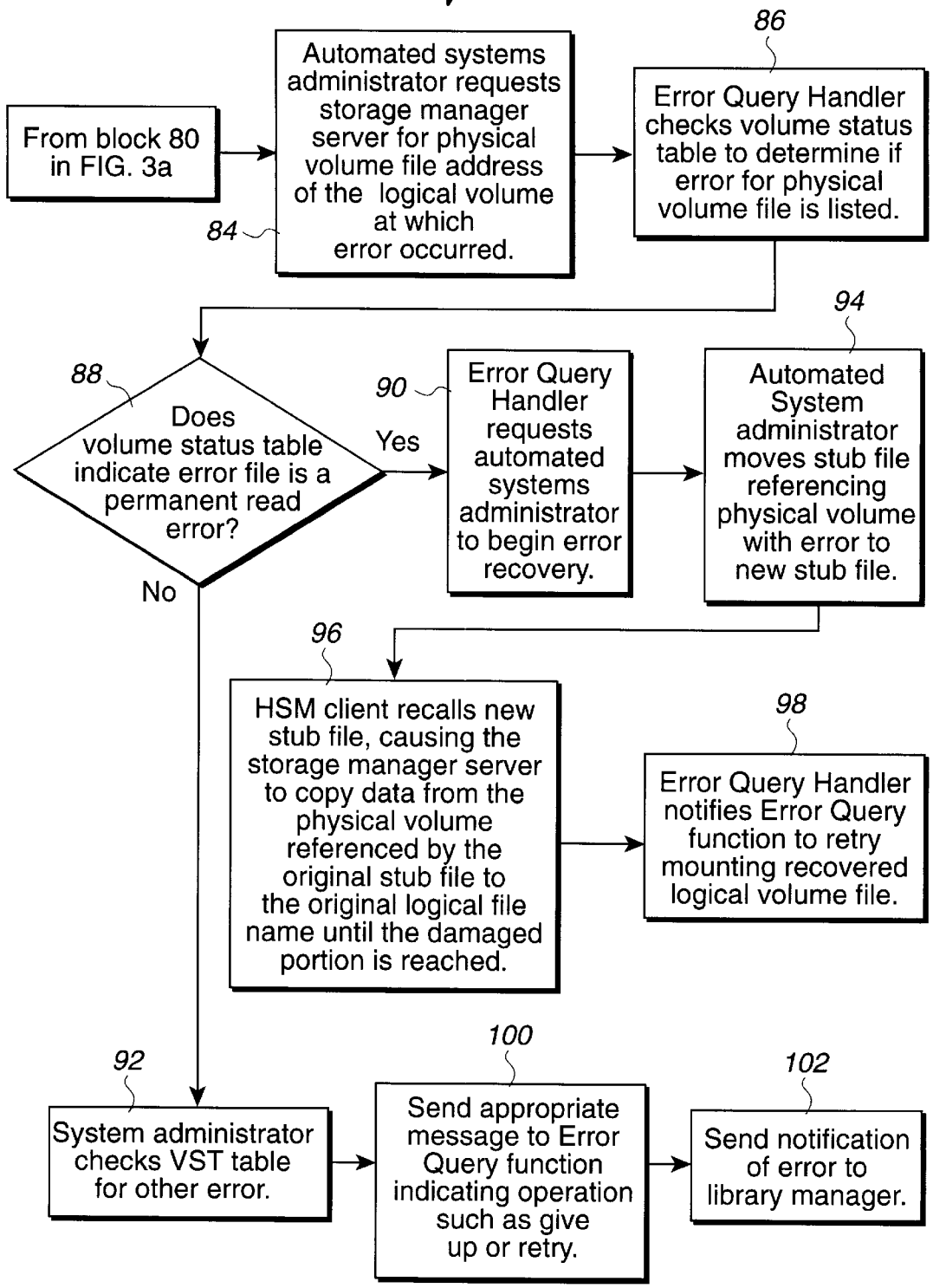

AUTOMATED FILE ERROR CLASSIFICATION AND CORRECTION IN A HIERARCHICAL STORAGE MANAGEMENT SYSTEM

BACKGROUND OF THE INVENTION

1. Field of the Invention

The present invention relates to a system for error classification and error handling in a hierarchical storage management system.

2. Description of the Related Art

Computer users today require ever increasing amounts of data storage to run complex applications, such as those involving digital imaging, multimedia, and video-on demand. These applications require massive amounts of data space to store files. Storage systems for non-volatile, long term storage of digital data include, magnetic tapes, magnetic hard disk drives, optical disks, holographic storage, etc. As the cost of magnetic hard disk drive space decreases, one solution is to use magnetic hard disk drives for long term data storage. Magnetic hard disk drives are preferred as they provide higher data transfer and access rates than other storage devices, such as magnetic tape cartridges, optical disks, etc.

Notwithstanding, there are many administrative labor costs associated with installing, configuring and managing hard disk drives. Furthermore, a large amount of data residing on hard drives is inactive. In fact, it is estimated that only twenty percent of information stored on a network is accessed during the course of a month. One solution is to store more frequently used data on hard disk drives and periodically back-up less frequently used data to magnetic tape such that the more frequently used data is resident on the hard disk drives. Such a system takes advantage of the low cost of tape drives and tape media to archive less frequently used data and at the same time maintain more frequently used data available on the faster, yet costlier, hard disk drives. Maintaining less frequently used data on slower hard disk drives will likely have a negligible effect on system users. The benefits of providing a primary storage of hard disk drives and a secondary storage comprised of a less expensive, and typically slower media, is further discussed in "ADSTAR Distributed Manager (ADSM)—Hierarchical Storage Management (HSM) White Paper (IBM Document No. G522-24322-00, International Business Machines, 1996), which is incorporate herein by reference in its entirety.

International Business Machines Corporation (IBM) developed the ADSTAR Distributed Storage Manager (ADSM) to provide hierarchical storage management (HSM) over data storage devices. The concept of HSM is to transparently migrate infrequently accessed data automatically from more costly, higher performance storage devices, such as hard disk drives, to less expensive, slower storage devices such as tape drives and optical libraries. In the ADSM system, when a primary storage device, such as a hard disk drive directly accessible to users, reaches a predetermined threshold, the least frequently used files are migrated to tape storage. The migrated files on the hard disk drive are replaced with a small stub file identifying the location of the migrated file on the tape drive. The stub file would present information on the file name and other characteristics to system users browsing the hard disk drive. Thus, to system users, the stub file appears to be the complete migrated file. When a system user accesses the stub file, the ADSM would recall the file represented by the stub file from the tape archive and copy it to the local hard drive to make the data available to system users. In this way, tape storage provides seamless and unlimited disk space which is accessible at all times to system users as if the data was always resident on the local hard disk drive.

Various system errors may arise when a server attempts to transfer data between secondary storage, such as a tape cartridge, and primary storage, such as a local hard disk drive. In many prior art systems, the server provides only limited information on the access error. For instance, the IBM AIX version for ADSM provides only minimal error information in the form of the ENOTREADY error code. The ENOTREADY code indicates that the tape system was not ready for operation or the tape was not loaded in the drive. Moreover, in prior art systems, if an error occurs when a tape drive is accessed during operations, the user must contact a human system administrator to diagnose and handle the error.

SUMMARY OF THE INVENTION

To overcome the limitations in the prior art described above, the present invention discloses a system to diagnose and handle an error in an automated hierarchical storage management system. A host system requests an access operation on a first file in a first storage device. A server processes the host request to determine whether the first file is resident in the first storage device. The server initiates a recall of a second file in a second storage device corresponding to the first file upon determining that the first file is not resident in the first storage device. The second file is then copied from the second storage device to the first file in the first storage device upon determining that the second file is accessible. The server further determines whether the recall of the second file in the second storage device has failed. If the recall fails, the server checks a table in a memory within the server to determine whether there is error information listed for the second file involved in the failed recall. The server then takes appropriate action based on the error information in the table.

In further embodiments, the first file is a logical volume observable to the host system and the second file is a physical volume in the second storage device that corresponds to the logical volume.

In still further embodiments, the first storage device is a magnetic hard disk drive and the second storage device is a member of the set of storage devices comprising magnetic tape cartridges, optical disks, holographic storage units, and magnetic hard disk drives.

It is an object of the present invention to provide detailed error information and error classification on file errors in a secondary storage device which provides back-up and archival storage for files in a primary storage device.

It is a further object to initiate error handling and recovery operations for files in the secondary storage device based on the detailed error information.

BRIEF DESCRIPTION OF THE DRAWINGS

Referring now to the drawings in which like reference numbers represent corresponding parts throughout:

FIGS. 3a and 3b are flowcharts illustrating logic used to classify and handle errors in accordance with a preferred embodiment of the present invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
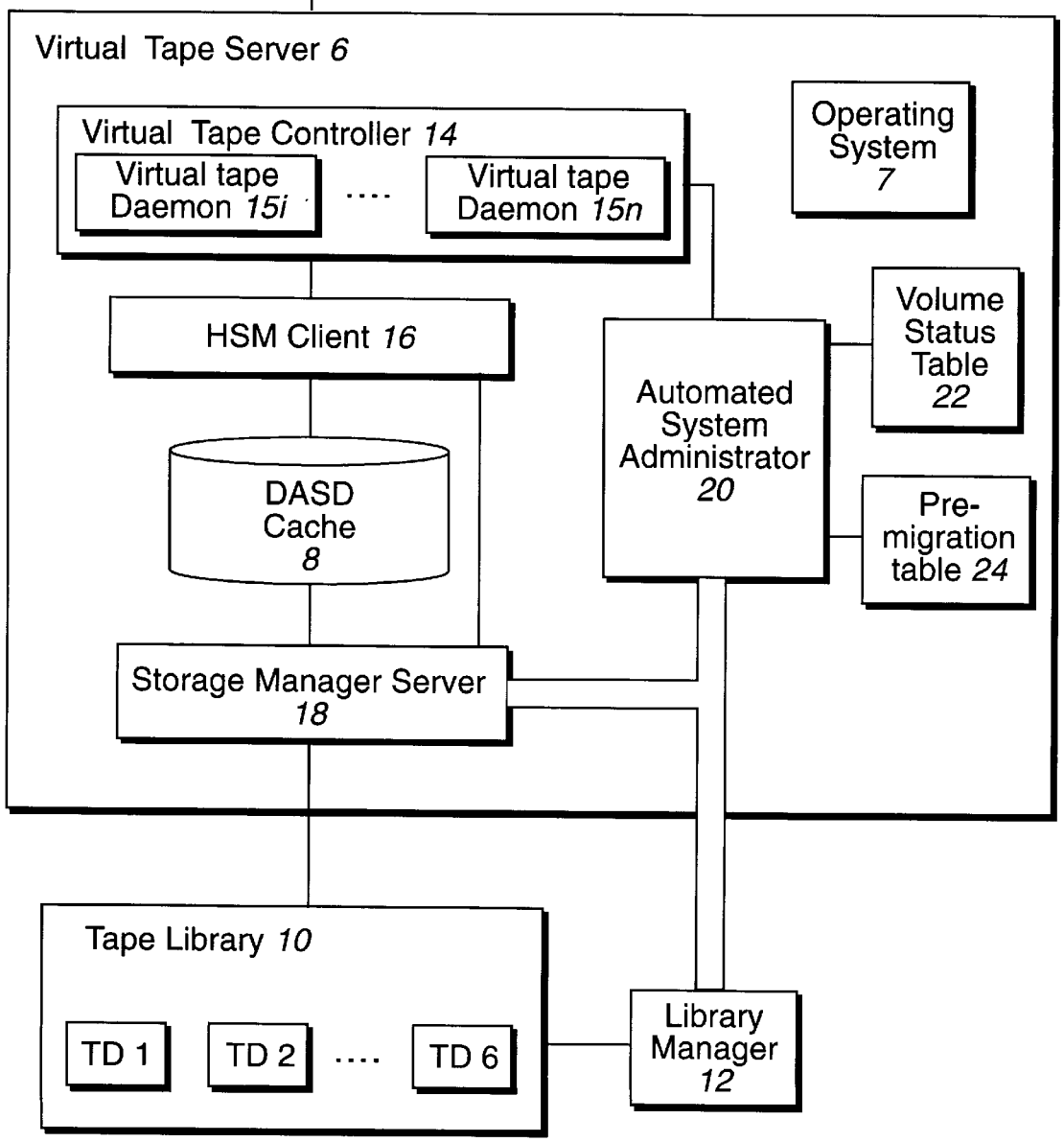
FIG. 1 is a block diagram illustrating an exemplary hardware and software environment of a preferred embodiment of the present invention.

FIG. 1 is a block diagram of a preferred embodiment of a distributed computer system 2 in accordance with the present invention. A host system 4 is linked to a virtual tape server 6 via a network connection (e.g., TCP/IP, LAN, Ethernet, the IBM Enterprise System Connection (ESCON), etc.). In preferred embodiments, the host system 4 is a computer, such as a personal computer, workstation, mainframe, etc. that is linked to the virtual tape server 6 via an ESCON channel. The host system 4 operates under control of an operating system such as MVS, AIX, Windows, etc. The virtual tape server 6 is a computer such as a personal computer, workstation or mainframe which operates under control of an operating system (OS) 7, such as the IBM Corporation AIX, MVS, VM or OS/390 operating system, or other operating systems such as Windows, UNIX, etc. The virtual tape server 6 is associated with a Direct Access Storage Device (DASD) cache 8. In preferred embodiments, the DASD cache 8 is comprised of a plurality of hard disk drives which are configured into one or more RAID arrays. The arrangement and organization of hard disk space into RAID arrays is described in Peter M. Chen, Edward K. Lee, Garth A. Gibson, Randy H. Katz, and David A. Patterson, "RAID: High-Performance, Reliable Secondary Storage," ACM Computing Surveys, Vol. 26, No. 2, June 1994, which is incorporated herein by reference in its entirety.

A tape library 10 includes a plurality of tape drives (TDs), such as the IBM Magstar 3590 tape drives. In the preferred embodiment of FIG. 1, the tape library 10 includes three to six tape drives (TDs). A tape cartridge is loaded into each tape drive (TDs). The tape library 10 could include hundreds of such cartridges. All host interaction with the tape library 10 is through the virtual tape server 6. The tape library 10 can load and eject tape cartridges using a robotic arm, and clean the tape drives. Further, the tape library 10 may include storage management software to monitor the active space on the tape cartridges and schedule reclamations of tape cartridges when the system is less active. In preferred embodiments, the tape library 10 may be comprised of a tape library such as the IBM Magstar 3494 Tape Library. A library manager 12 has the ability to install, maintain, configure, and operate the tape library 10. The library manager 12 consists of a controller (a personal computer, workstation, etc.) which can assume direct control over the tape library 10.

The DASD cache 8 provides a cache for data stored in the tape library 10. The DASD cache 8 maintains logical volumes as logical volume files which are concatenated into physical volume files in the tape cartridges loaded in the tape drives (TDs). When a logical volume file in the DASD cache 8 moves to a tape drive (TD) in the tape library 10, the logical volume file is written to a physical volume file in the actual tape drive (TD). When a physical volume file is recalled from a tape drive (TD) and moved to the DASD cache 8 it then becomes a logical volume file in the DASD cache 8. In this way, the DASD cache 8 provides a window to the host system 4 of all physical volumes in the tape library 10. In preferred embodiments, the logical volume files comprise 250 Mb to 800 Mb of storage space. The size of the logical volume file may be reduced to minimize the time needed to transfer a volume from the tape library 10 to the DASD cache 8 or, alternatively, increased in size as the size of hard disk drives and tape cartridge transfer speeds increase.

Upon initialization, the virtual tape server 6 loads a virtual tape controller 14 into random access memory (RAM). The virtual tape controller 14 is comprised of a plurality of virtual tape daemons $15_i$ which represent and emulate to the host system virtual tape devices. In the preferred embodiment, n equals thirty two, which means that there are thirty-two virtual tape daemons $15_0$ to $15_{31}$ and, likewise, thirty-two virtual tape devices. The host system 4 operating system manages the presentation of virtual tape devices to system users. The host system 4 views the virtual tape devices as actual tape drives. When the host system 4 attempts to access a logical volume in a selected virtual tape device, the virtual tape daemon $15_i$ for the virtual tape device requested by the host system 4 would handle the host access request. For instance, if the host system 4 requests to access virtual tape device 4, virtual tape daemon $15_3$ in the virtual tape controller 14 would handle the host 4 request. The virtual tape daemons $15_0$ to $15_n$ cooperate with the kernel of the operating system 7 to intercept requests by the host system 4 to access a logical volume in a virtual tape device in the DASD cache 8.

A hierarchical storage management (HSM) client program 16 intercepts and processes the access request from the virtual tape daemons ($15_0$ to $15_n$). The HSM client 16 then carries out the host system 4 request to access the logical volume file on the DASD cache 8. In preferred embodiments, the HSM client program 16 is part of the IBM ADSTAR Distributed Storage Manager (ADSM) product, which is described in "ADSM Version 2 Presentation Guide," (IBM Document SG24-4532-00, International Business Machines, copyright 1995). ADSM provides generic client/server HSM functions. The ADSM product includes an ADSM client to handle file access requests with software integrated with the operating system kernel.

A storage manager server program 18 handles data transfers between the DASD cache 8 and the tape library 10. For instance, if the HSM client 16 attempts to mount a logical volume file which is not located on the DASD cache 8, then the HSM client 16 will communicate the access request to the storage manager server 18. If the tape in the access request is mounted in a tape drive (TD) in the tape library 10, then the storage manager server 18 will access the physical volume for the requested logical volume file from the mounted tape. However, if the requested file is on a tape not presently mounted in a tape drive (TD), then the storage manager server 18 will request the library manager 12 to mount the tape containing the physical volume corresponding to the requested logical volume file. In preferred embodiments, the storage manager server 18 program is part of the IBM ADSM product. The ADSM product includes the ADSM server to manage transfer of files from a client, which in FIG. 1 is the HSM client 16, to a storage area, which in FIG. 1 is the tape library 10. In preferred embodiments the HSM client 16 and storage manager server 18 are on the same machine, i.e., the virtual tape server 6. In such case, the HSM client 16 and storage manager server 18 utilize the memory of the virtual tape server 6 to transfer data and control information therebetween. ADSM provides its shared memory protocol for communication between the HSM client 16 and storage manager server 18 on the same machine. In alternative embodiments, the virtual tape server 6 may be distributed across multiple computers. In such case, the storage manager server and HSM client 16 may be on different computer platforms and communicate via a network protocol such as TCP/IP, IPX/SPX, etc.

In preferred embodiments, the storage manager server 18 migrates entire logical volume files from the DASD cache 8 to the tape library 10. When the available space in the DASD cache 8 reaches a predetermined level, the HSM client 16 will direct the storage manager server 18 to migrate logical volume files from the DASD cache 8 to the tape library 10 for archival therein. The HSM client 16 will substitute the migrated logical volume file with a stub file which includes all the information needed to locate and recall a physical volume file from the tape library 10 that corresponds to the logical volume file represented by the stub file. Thus, the stub file would appear to a host system 4 as a logical volume. However, when the HSM client 16 attempts to access a stub file, the HSM client would have the storage manager server 18 recall the logical volume file from the physical volume in the tape library 10 to replace the stub file in the DASD cache 8. Typically, the HSM client 16 would migrate the least used logical volume files.

An automated systems administrator 20 program included in the virtual tape server 6 performs operations typically performed by a human systems administrator. The automated systems administrator 20 filters any error messages concerning the tape library 10 that are generated by the storage manager server 18. The storage manager server 18 receives error information updates from the library manager 12. The automated systems administrator 20 stores information associated with physical volumes in an associated volume status table 22. In preferred embodiments, the volume status table 22 is maintained in a memory structure accessible to the automated systems administrator program 20. The volume status table 22 includes a minimum of two columns of information. The first column identifies the physical volume of a tape cartridge, including its serial number and/or tape identification number, and the second column includes an entry describing a particular problem with the tape cartridge or physical volume identified in the first column.

A premigration table 24 is a further memory structure accessible to the automated systems administrator 20. The premigration table 24 maintains information on any logical volume files that are in the process of being premigrated from the DASD cache 8 to the tape library 10. During premigration, a logical volume file is locked while the storage manager server 18 copies data from the logical volume file in the DASD cache 8 to the tape library 10. While the storage manager server 18 is copying a logical volume file from the DASD cache 8 to the tape library 10, the file name is placed in the premigration table 24 to indicate that the logical volume file is presently in the process of being premigrated. Once the logical volume file is copied over to the tape library 10, the logical volume file name is removed from the premigration table 24. At this point, the logical volume file is maintained in both the DASD cache 8 and the tape library 10. When the available space in the DASD cache 8 reaches a predetermined low threshold, the logical volume files that have been premigrated, such that a copy is maintained in both the DASD cache 8 and the tape library, are deleted from the DASD cache 8 and replaced with a stub file. This process of deleting the logical volume files from the DASD cache 8 and replacing the moved files with a stub file is referred to herein as migration.

In preferred embodiments, the automated systems administrator program 20 determines when the storage manager server 18 should premigrate and migrate files from the DASD cache 8 to the tape library 10. In such case, the automated systems administrator program 20 would update the premigration table 24 with those files in the DASD cache 8 that are in the process of being premigrated. Moreover, the automated systems administrator 20 provides error information to the library manager 12.

Figure 2:
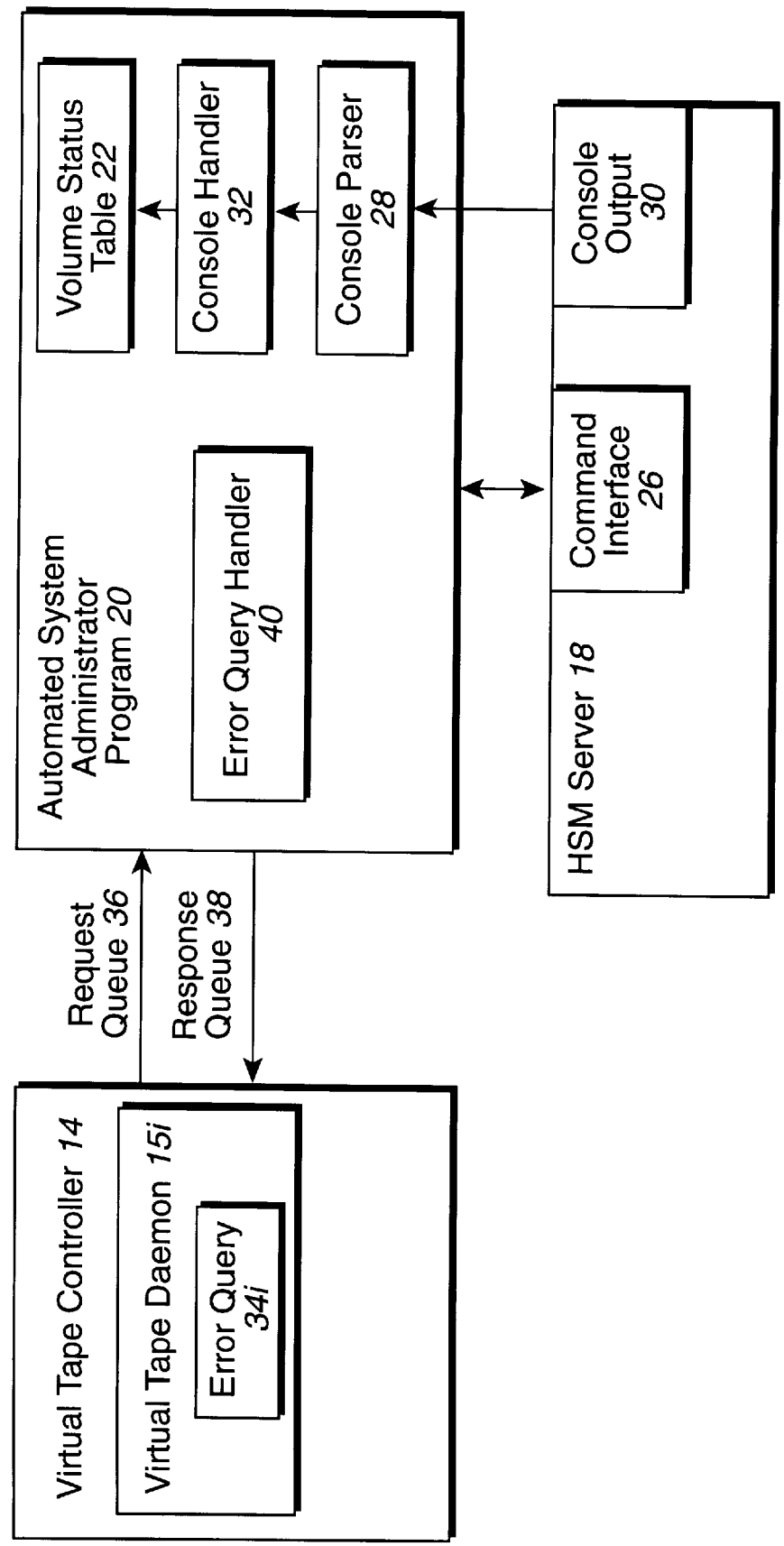
FIG. 2 is a block diagram illustrating an arrangement of software objects and threads in accordance with a preferred embodiment of the invention.

FIG. 2 is a block diagram providing further details on the software components within the system administration program 20, the storage manager server 18, and the virtual tape daemons $15_0$–$15_n$, and the interaction therebetween. The automated systems administrator program 20 can transmit commands to the storage manager server 18 to control tape library 10 access operations via a command interface 26 thread in the storage manager server 18. For instance, the automated systems administrator 20 could cause the storage manager server 18 to migrate logical volumes files from the DASD cache 8 to the tape library 10 by issuing such a command to the command interface 26 thread of the storage manager server 18. The automated systems administrator 20 includes a Console Parser 28 thread which receives input from a console output 30 of the storage manager server 18. The console output 30 pipes all storage manager server 18 error messages to the Console Parser 28, which then sends the parsed messages to a Console Handler 32 thread. The Console Handler 32 thread determines whether the error message is relevant to the operation of the tape library 10. If the error message is relevant, then the Console Handler 32 updates the volume status table 22 with the error information. As discussed, the error information maintained in the volume status table 22 is maintained on a physical volume file basis. The automated systems administrator 20 can provide error messages to the library manager 12 which were provided to one of the virtual tape daemons $15_0$ to $15_n$.

A virtual tape daemon $15_i$ may receive an error message from the HSM client 16 without any indication of the nature of the error. To further diagnose the error, the virtual tape daemon $15_i$ would call an Error Query $34_i$ function, shown in FIG. 2, to diagnose the error and take any appropriate action. The Error Query $34_i$ function takes as parameters the logical volume file name where the error occurred and the error type. For instance, in the IBM AIX operating system, a typical error message is ENOTREADY, which indicates that a tape drive (TD) within the tape library 10 was not ready for operation or a tape cartridge is not mounted in the tape drive (TD). The Error Query $34_i$ function builds a request, which is then transferred via a Request Queue 36 to an Error Query Handler 38 thread in the automated systems administrator 20. The Error Query Handler 38 thread processes the request and returns a response to the appropriate Error Query $34_i$ function via a Response Queue 40. Numerous Error Query $34_i$ functions could be called simultaneously. For instance, virtual tape daemons $15_0$–$15_n$ could all call and execute their respective Error Query $34_0$–$34_n$ functions simultaneously.

Error Classification and Handling

FIGS. 3a and 3b are flowcharts illustrating preferred embodiments of the logic for handling an error when a host 4 attempts to access a file in the tape library 10. This logic is implemented in the software and hardware components of the host 4, virtual tape server 6, tape library 10, and library manager 12. Those skilled in the art will recognize that this logic is provided for illustrative purposes only and that different logic may be used to accomplish the same results.

Control begins at block 50 which represents the host system 4 attempting to access a logical volume in a virtual tape device, which is linked by a corresponding virtual tape daemon $15_i$ to the requested logical volume file in the DASD cache 8. Logical volume files have corresponding physical volume files in the tape library 10. Examples of file access operations include open, read, and write operations. Control transfers to block 52 which represents the host 4 requesting the virtual tape server 6 to mount the virtual tape device with a logical volume. Control transfers to block 54 which represents the appropriate virtual tape daemon $15_i$ processing the request to mount the logical volume from the host 4. At block 56, the virtual tape daemon $15_i$ generates a request to mount the logical volume file requested by the host 4. Control transfers to block 58 which represents the HSM client 16 processing the request from the virtual tape daemon $15_i$ to open the logical volume file. At block 60, the HSM client 16 checks if the logical volume file is resident in the DASD cache 8. Control transfers to block 62 which is a decision block representing the HSM client 16 determining whether the targeted logical volume file is loaded in the DASD cache 8. If so, control transfers to block 64; otherwise control transfers to block 66.

Block 64 represents the HSM client 16 notifying the requesting virtual tape daemon $15_i$ that the logical volume file is mounted in the DASD cache 8. The virtual tape daemon $15_i$ then notifies the host system 4 that the logical volume is mounted and that that file access request(s) for the files located in the mounted logical volume can be serviced. If the logical volume file is not resident in the DASD cache 8, then control transfers to block 66, which represents the HSM client 16 requesting the storage manager server 18 to recall the logical volume file from the corresponding physical volume on a tape drive (TD) in the tape library 10. Control then transfers to block 68 which represents the storage manager server 18 failing in its attempt to recall the logical volume file from the physical volume file in the tape library 10. As discussed, in preferred embodiments, the storage manager server 18 can access tapes directly in the tape library 10. However, if a tape is not mounted, the storage manager server 18 must request the library manager 12 to mount the tape. Typically, the error message provided from the library manager 12 to the storage manager server 18 will only indicate that an error has occurred without indicating the type of error, e.g., ENOTREADY. The HSM client 16 passes this error message to the requesting virtual tape daemon 15i. Upon receiving the generic error message, at block 70, the requesting virtual tape daemon $15_i$ calls the Error Query $34_i$ function. The called Error Query $34_i$ function receives the name of the logical volume file which failed to mount and the error message, and based thereon builds a request for error information which is transmitted to the Error Query Handler 40 in the automated systems administrator 20 via the Request Queue 36.

Control transfers to block 72, which represents the Error Query Handler 40 thread processing the request from the called Error Query $34_i$ function in virtual tape daemon $14_i$. Control transfers to block 74 which represents the Error Query Handler 40 checking the premigration table 24. At block 76, the Error Query Handler 40 determines whether the requested logical volume file is in the premigration table 24, thereby indicating that the requested logical volume file is presently being premigrated to the tape library 10. If so, control transfers to block 78; otherwise, control transfers to block 80. Block 78 represents the Error Query Handler 40 notifying the Error Query 34 thread via the Response Query 38 to retry mounting the logical volume file after determining that the automated systems administrator 20 has now removed the logical volume file name from the premigration table 24. As discussed, after premigration, the logical volume file is resident in both the DASD cache 8 and the tape library 10.

Block 80 is a decision block representing the error query handler 40 determining whether the requested logical volume file is resident in the DASD cache 8. If so, control transfers to block 82; otherwise control transfers to block 84. Block 82 represents the Error Query Handler 40 notifying the Error Query $34_i$ function via the Response Queue 38 to retry mounting the logical volume file as the logical volume file is not in the premigration table and is resident in the DASD cache 8. Block 84 is shown in FIG. 3b and represents the automated systems administrator 20 requesting the storage manager server 18 via the command interface 26 for the physical volume file address of the logical volume file at which the error occurred. Control transfers to block 86 which represents the Error Query Handler 40 thread checking the volume status table 22 for error information for the physical volume file provided by the storage manager server 18 where the error occurred. Control then transfers to block 88 which represents the Error Query Handler 40 determining whether the error in the volume status table 22 for the physical volume file is a permanent read error. If so, control transfers to block 90; otherwise, control transfers to block 92.

If the error for the physical volume file in the volume status table 22 is a permanent read error, then, at block 90, the Error Query Handler 40 requests the automated systems administrator 20 to initiate the recovery process. Control transfers to block 94 which represents the automated systems administrator 20 moving the stub file ($F_O$) that references the physical volume with the read error to a new file name ($F_1$) on the DASD cache 8. Control transfers to block 96 which represents the HSM client 16 recalling the stub file ($F_1$) and requesting the storage manager server 18 to recover data from the physical volume referenced by the stub file ($F_1$) by copying data from the physical volume to a file with the original file name ($F_O$) on the DASD cache 8 until the damaged portion of the physical volume file is reached. After copying as much data as possible from the front end of the physical volume file to the file ($F_O$) in the DASD cache 8, the error recovery process is terminated. At the completion of error recovery, the recovered data is maintained in the file name ($F_O$) and the original contents for the stub file ($F_O$) are maintained in stub file ($F_1$). The stub file is maintained because the entire logical volume file was not successfully mounted from the tapes. The Error Query Handler 40 is notified of the termination of the error recovery process. Control then transfers to block 98 which represents the Error Query Handler 40 notifying the Error Query $34_i$ function to retry accessing the logical volume file in the DASD cache 8. In alternative embodiments, during the read recovery process, the storage manager server 18 may copy all data on the tape cartridge in the tape drive (TD) prior to the damaged portion of the tape, then skip the damaged portion of the tape cartridge, and then proceed to copy data following the damaged portion. Other alternative methods for recovering data known by those skilled in the art could also be employed to recover as much data as possible from the tape drive (TD) where the permanent read error is located, including the use of error correction codes (ECC).

If the error in the volume status table 22 for the physical volume is not a permanent read error, control transfers to block 92 which represents the Error Query Handler 40 identifying a different error type in the volume status table 22. Control then transfers to block 100, which represents the Error Query Handler 40 generating and transmitting an appropriate response to the Error Query $34_i$ function via the Response Query 38 based on the error located in the volume status table 22. The Error Query Handler 40 may indicate to the Error Query $34_i$ function an appropriate action for the error listed in the volume status table 22, such as to retry mounting the logical volume or give-up. After the error is handled, control transfers to block 102 which represents the automated systems administrator 20 sending an error notification message to the library manager 12.

For instance, if the volume status table 22 indicates that the targeted physical volume file is on a tape cartridge that is missing, then the Error Query Handler 40 would notify the Error Query $34_i$ function to give up attempting to mount the missing tape cartridge and provide a message to the library manager 12 that the recall of a physical volume file has failed because the tape cartridge containing the physical volume file is missing. In further embodiments, the Error Query $34_i$ function may receive the retry response from the Error Query Handler 40 several times if the same error reoccurs. In such case, the Error Query $34_i$ function would give-up attempting to mount the logical volume file after failing a predetermined number of retries.

In this way, preferred embodiments of the present invention provide logical to physical error mapping, and a system for automated and intelligent error classification, error handling, and retry control.

CONCLUSION

This concludes the description of the preferred embodiments of the invention. The following describes some alternative embodiments for accomplishing the present invention.

Preferred embodiments were described with respect to a software arrangement in the virtual tape server comprising various threads and objects. Those skilled in the art will appreciate that an alternative software structure comprised of alternative threads and objects could be utilized. Still further, the preferred embodiment described the virtual tape server and the software components thereof as being implemented in a single computer. However, in alternative embodiments, the functions performed by the virtual tape server 6 and software components thereof could be distributed across multiple computer platforms.

In the preferred embodiment, the DASD cache 8 is comprised of magnetic hard disk drives. In alternative embodiments, the DASD cache 8 could be comprised of any suitable non-volatile memory storage device known in the art. Still further, the tape library 10 is described as comprised of magnetic tape cartridges. However, in alternative embodiments, the tape library 10 may be comprised of magnetic hard disk drives, optical disks, holographic storage units, and any other non-volatile storage medium known in the art that is suitable for archival and backup purposes.

Preferred embodiments are described with respect to logical and physical volumes stored as single files having a size of 250 Mb to 800 Mb. However, in alternative embodiments, the logical and physical volumes may be stored as groups of files having various sizes or as a single file having a size different from the sizes discussed above.

In summary, preferred embodiments in accordance with the present invention provide a system to diagnose and handle errors in an automated hierarchical storage management system. A host system requests an access operation on a first file in a first storage device. A server processes the host request to determine whether the first file is resident in the first storage device. The server initiates a recall of a second file in a second storage device corresponding to the first file upon determining that the first file is not resident in the first storage device. The second file is then copied from the second storage device to the first file in the first storage device upon determining that the second file is accessible. The server further determines whether the recall of the second file in the second storage device has failed. If the recall fails, the server checks a table in memory within the server to determine whether there is error information listed for the second file involved in the failed recall. The server then takes appropriate action based on the error information in the table.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method to diagnose and handle an error in an automated hierarchical storage management system, comprising:

a) processing a host request for an access operation on a first file in a first storage device with a server to determine whether the first file is resident in the first storage device;

b) initiating a recall with the server of a second file in a second storage device corresponding to the first file upon determining that the first file is not resident in the first storage device;

c) copying the second file from the second storage device to the first file in the first storage device upon determining that the second file is accessible;

d) determining whether the recall of the second file in the second storage device has failed;

e) initiating a process to check a table in a memory within the server to determine information indicating operations to perform if the recall of the second file failed; and f) notifying the server to retry the access operation after performing the operations.

2. The method of claim 1, wherein the first file is a logical volume observable by the host system and the second file is a physical volume in the second storage device corresponding to the logical volume.

3. The method of claim 1, wherein the operations to perform include checking a premigration table in the server memory to determine whether the requested first file is in the process of being copied to the second file in the second storage device, wherein the server is notified to retry the access operation on the first file if the first file has been removed from the premigration table, thereby indicating that the data in the first file is resident in both the first storage device and the second storage device.

4. The method of claim 1, wherein the step of processing the host request is handled by a first program in the server which transfers the host request to a second program in the server, wherein the second program determines whether the first file is resident in the first storage device.

5. The method of claim 4, wherein the second storage device includes mountable media, wherein a library manager mounts the media in the second storage device, and wherein the step of initiating a recall is performed by a third program in the server, further including the steps of:

determining with the third program whether the media including the second file is mounted in the second storage device; and requesting with the third program the library manager to mount the media including the second file, wherein the second file in the mounted media is capable of being accessed by the third program.

6. The method of claim 1, wherein the step of checking the table is performed by a systems administrator program, further including the steps of:

receiving with the system administrator program error information on a second file in the second storage device; and creating with the system administrator program an entry in the table to maintain the received error information for the second file.

7. The method of claim 1, wherein the first storage device is comprised of one or more magnetic hard disk drives and the second storage device is a member of a the set of storage devices comprising magnetic tape cartridges, optical disks, holographic storage units, and magnetic hard disk drives.

8. The method of claim 1, further comprising taking action to correct the error with the second file based on the error information in the table if there is error information listed in the table, wherein the server is notified to retry the recall of the second file after the error with the second file is corrected.

9. A method to diagnose and handle an error in an automated hierarchical storage management system, comprising:

(a) requesting with a host system an access operation on a first file in a first storage device;

(b) processing the host request with a server to determine whether the first file is resident in the first storage device;

(c) initiating a recall with the server of a second file in a second storage device corresponding to the first file upon determining that the first file is not resident in the first storage device;

(d) copying the second file from the second storage device to the first file in the first storage device upon determining that the second file is accessible;

(e) determining whether the recall of the second file in the second storage device has failed;

(f) checking with the server a table in a memory within the server to determine whether there is error information that indicates that there is a permanent read error in the second file if the recall of the second file has failed;

(g) moving the first file to a third file in the first storage device;

(h) recovering as much data as possible from the second file;

(i) copying the data recovered from the second file to the first file in the first storage device; and (j) retrying the access operation on the first file.

10. The method of claim 7, wherein the first file has a first name, the second file has a second name, and the third file has a third name, and wherein the step of recovering as much data as possible from the second file comprises copying data from the second file in the second storage device to a file in the first storage device having the first name until an error in the second file is reached.

11. A computer system to diagnose and handle an error in an automated hierarchical storage management system when a host system attempts an access operation, comprising:

(a) a server in communication with the host system, wherein the server includes means for processing a request by the host system to access a first file;

(b) a first storage device in communication with the server;

(c) a second storage device in communication with the server;

(d) means, performed by the server, for determining whether the first file is resident in the first storage device;

(e) means, performed by the server, for initiating a recall of a second file in a second storage device corresponding to the first file upon determining that the first file is not resident in the first storage device;

(f) means for copying the second file from the second storage device to the first file in the first storage device upon determining that the second file is accessible;

(g) means, performed by the server, for determining whether the recall of the second file in the second storage device has failed;

(h) a memory in the server storing a table containing error information for files in the second storage device;

(i) means, performed by the server, for initiating a process to check the table to determine information indicating operations to perform if the recall of the second file has failed; and (j) means for notifying the server to retry the access operation on the first file after performing the operations.

12. The computer system of claim 11, wherein the first file is a logical volume observable by the host system and the second file is a physical volume in the second storage device corresponding to the logical volume.

13. The computer system of claim 11, further including:

a premigration table in the server memory, wherein the premigration table includes information indicating whether a first file in the first storage device is in the process of being copied to the second file in the second storage device; and means, performed by the server, for retrying the access operation on the first file if the first file has been removed from the premigration table.

14. The computer system of claim 11, further including:

a first program in the server, wherein the means for processing the host request is handled by the first program; and a second program in the server, wherein the first program transfers the host request to the second program, and wherein the second program determines whether the first file is resident in the first storage device.

15. The computer system of claim 14, further including:

a mountable media within the second storage device;

a library manager, wherein the library manager mounts the media in the second storage device;

a third program in the server for determining whether the media including the second file is mounted in the second storage device and requesting with the third program the library manager to mount the media including the second file, wherein the second file in the mounted media is capable of being accessed by the third program.

16. The computer system of claim 11, wherein the means for checking the table is performed by a system administrator program, further including:

means, performed by the system administrator program, for receiving error information on a second file in the second storage device; and means, performed by the system administrator program, for creating an entry in the table to maintain the received error information for the second file.

17. The computer system of claim 11, wherein the first storage device is comprised of one or more magnetic hard disk drives and the second storage device is a member of a set of storage devices comprising magnetic tape cartridges, optical disks, holographic storage units, and magnetic hard disk drives.

18. The system of claim 11, further comprising means for taking action to correct the error with the second file based on the error information in the table if there is error information listed in the table, wherein the server is notified to retry the recall of the second file after the error with the second file is corrected.

19. A computer system to diagnose and handle an error in an automated hierarchical storage management system when a host system attempts an access operation, comprising:

a server in communication with the host system, wherein the server includes means for processing a request by the host system to access a first file;

a first storage device in communication with the server;

a second storage device in communication with the server;

means, performed by the server, for determining whether the first file is resident in the first storage device;

means, performed by the server, for initiating a recall of a second file in a second storage device corresponding to the first file upon determining that the first file is not resident in the first storage device;

means for copying the second file from the second storage device to the first file in the first storage device upon determining that the second file is accessible;

means, performed by the server, for determining whether the recall of the second file in the second storage device has failed;

a memory in the server storing a table containing error information for files in the second storage device;

means, performed by the server, for checking the table to determine whether the table includes error information that indicates that there is a permanent read error in the second file if the recall of the second file has failed; and means for moving the first file to a third file in the first storage device;

means for recovering as much data as possible from the second file;

means for copying the data recovered from the second file to the first file in the first storage device, thereby replacing the contents of the first file with the data recovered from the second file; and means, performed by the server, for retrying the access operation on the first file.

20. The computer system of claim 19, wherein the first file has a first name, the second file has a second name, and the third file has a third name, and wherein the means for recovering as much data as possible in the second file further comprises means for copying data from the file stored under the second name in the second storage device to a file in the first storage device having the first name until an error in the file having the second name is reached.

21. An article of manufacture for use in programming a server to diagnose and handle errors in an automated hierarchical storage management system, the article of manufacture comprising a computer readable storage medium having computer objects embodied therein that cause the server to perform the steps of:

(a) processing a request from a host system to access a first file in a first storage device;

(b) determining whether the first file is resident in the first storage device;

(c) initiating a recall of a second file in a second storage device corresponding to the first file upon determining that the first file is not resident in the first storage device;

(d) requesting to copy the second file from the second storage device to the first file in the first storage device upon determining that the second file is accessible;

(e) determining whether the recall of the second file in the second storage device has failed;

(f) initiating a process to check a table in a memory within the server to determine information indicating operations to perform if the recall of the second file has failed; and (g) notifying the server to retry the access operation on the first file after performing the operations.

22. The article of manufacture of claim 21, wherein the first file is a logical volume observable by the host system and the second file is a physical volume in the second storage device corresponding to the logical volume.

23. The article of manufacture of claim 21, wherein operations to perform includes checking a premigration table in the server memory to determine whether the requested first file is in the process of being copied to the second file in the second storage device, wherein the server is notified to retry the access operation on the first file if the first file has been removed from the premigration table, thereby indicating that the data in the first file is resident in both the first storage device and the second storage device.

24. The article of manufacture of claim 19, wherein the step of processing the host request is handled by a first program in the server which transfers the host request to a second program in the server, wherein the second program determines whether the first file is resident in the first storage device.

25. The article of manufacture of claim 24, wherein the second storage device includes a mountable media, wherein a library manager mounts the media in the second storage device, and wherein the step of initiating a recall is performed by a third program in the server, further including the steps of:

determining with the third program whether the media including the second file is mounted in the second storage device; and requesting with the third program the library manager to mount the media including the second file, wherein the second file is capable of being accessed by the third program.

26. The article of manufacture of claim 19, wherein the step of checking the table is performed by a system administrator program, further including the steps of:

receiving with the system administrator program error information on a second file in the second storage device; and creating with the system administrator program an entry in the table to maintain the received error information for the second file.

27. The article of manufacture of claim 21, further comprising taking action to correct the error with the second file based on the error information in the table if there is error information listed in the table, wherein the server is notified to retry the recall of the second file after the error with the second file is corrected.

28. An article of manufacture for use in programming a server to diagnose and handle errors in an automated hierarchical storage management system, the article of manufacture comprising a computer readable storage medium having computer objects embodied therein that cause the server to perform the steps of:

processing a request from a host system to access a first file in a first storage device;

determining whether the first file is resident in the first storage device;

initiating a recall of a second file in a second storage device corresponding to the first file upon determining that the first file is not resident in the first storage device;

requesting to copy the second file from the second storage device to the first file in the first storage device upon determining that the second file is accessible;

determining whether the recall of the second file in the second storage device has failed;

checking a table in a memory within the server to determine whether there is error information that indicates that there is a permanent read error in the second file if the recall of the second file has failed;

moving the first file to a third file in the first storage device;

initiating an operation to recover as much data as possible from the second file;

copying the data recovered from the second file to the first file in the first storage device; and retrying the access operation on the first file.

29. The article of manufacture of claim 28, wherein the first file has a first name, the second file has a second name, and the third file has a third name, and wherein the step of recovering as much data as possible from the second file comprises the step of copying data from the file stored under the second name in the second storage device to a file in the first storage device having the first name until an error in the file having the second name is reached.

* * * * *

UNITED STATES PATENT AND TRADEMARK OFFICE
CERTIFICATE OF CORRECTION

PATENT NO.     : 6,023,709
DATED          : February 8, 2000
INVENTOR(S)    : Anglin et al.

Page 1 of 1

It is certified that error appears in the above-identified patent and that said Letters Patent is hereby corrected as shown below:

Column 12, claim 10,
Line 4, please delete "claim 7" and insert -- claim 9 --.

Signed and Sealed this

Sixteenth Day of April, 2002

Attest:

JAMES E. ROGAN
Attesting Officer   Director of the United States Patent and Trademark Office